US012293768B2

(12) United States Patent
Kjörling et al.

(10) Patent No.: US 12,293,768 B2
(45) Date of Patent: *May 6, 2025

(54) AUDIO DECODER FOR INTERLEAVING SIGNALS

(71) Applicant: Dolby International AB, Dublin (IE)

(72) Inventors: Kristofer Kjörling, Solna (SE); Heiko Purnhagen, Sundbyberg (SE); Harald Mundt, Fürth (DE); Karl Jonas Roeden, Solna (SE); Leif Sehlström, Järfälla (SE)

(73) Assignee: Dolby International AB, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/504,879

(22) Filed: Nov. 8, 2023

(65) Prior Publication Data

US 2024/0153517 A1 May 9, 2024

Related U.S. Application Data

(60) Continuation of application No. 17/463,192, filed on Aug. 31, 2021, now Pat. No. 11,830,510, which is a (Continued)

(51) Int. Cl.
*G10L 19/00* (2013.01)
*G10L 19/008* (2013.01)
(Continued)

(52) U.S. Cl.
CPC ............ *G10L 19/20* (2013.01); *G10L 19/008* (2013.01); *G10L 19/0212* (2013.01);
(Continued)

(58) Field of Classification Search
CPC ..... G10L 19/008; G10L 19/20; G10L 19/167; G10L 19/0212; G10L 25/18;
(Continued)

(56) References Cited

U.S. PATENT DOCUMENTS 4,049,917 A 9/1977 Copperi
6,791,955 B1 9/2004 Kikuchi
(Continued)

FOREIGN PATENT DOCUMENTS

CN 101911732 12/2010
CN 101371447 B 6/2012
(Continued)

OTHER PUBLICATIONS

"Text of ISO/IEC 23003-1:200 MPEG Surround" MPEG Meeting Oct. 17-21, 2005, ISO/IEC JTC1/SC29/WG11.

(Continued)

*Primary Examiner* — Michael Ortiz-Sanchez

(57) ABSTRACT

A method for decoding an encoded audio bitstream in an audio processing system is disclosed. The method includes extracting from the encoded audio bitstream a first waveform-coded signal comprising spectral coefficients corresponding to frequencies up to a first cross-over frequency for a time frame and performing parametric decoding at a second cross-over frequency for the time frame to generate a reconstructed signal. The second cross-over frequency is above the first cross-over frequency and the parametric decoding uses reconstruction parameters derived from the encoded audio bitstream to generate the reconstructed signal. The method also includes extracting from the encoded audio bitstream a second waveform-coded signal comprising spectral coefficients corresponding to a subset of frequencies above the first cross-over frequency for the time frame and interleaving the second waveform-coded signal with the reconstructed signal to produce an interleaved signal for the time frame.

8 Claims, 8 Drawing Sheets

100

Related U.S. Application Data continuation of application No. 16/593,830, filed on Oct. 4, 2019, now Pat. No. 11,114,107, which is a division of application No. 15/641,033, filed on Jul. 3, 2017, now Pat. No. 10,438,602, which is a continuation of application No. 15/227,283, filed on Aug. 3, 2016, now Pat. No. 9,728,199, which is a continuation of application No. 14/772,001, filed as application No. PCT/EP2014/056852 on Apr. 4, 2014, now Pat. No. 9,489,957.

(60) Provisional application No. 61/808,680, filed on Apr. 5, 2013.

(51) Int. Cl.

*G10L 19/02* (2013.01)
*G10L 19/16* (2013.01)
*G10L 19/20* (2013.01)
*G10L 25/18* (2013.01)
*H04S 3/00* (2006.01)

(52) U.S. Cl.

CPC ............ *G10L 19/167* (2013.01); *G10L 25/18* (2013.01); *H04S 3/008* (2013.01); *H04S 2400/03* (2013.01); *H04S 2420/03* (2013.01)

(58) Field of Classification Search

CPC ... G10L 19/0204; G10L 19/04; G10L 19/032; G10L 19/02; G10L 19/06; H04S 2400/03; H04S 2420/03; H04S 3/008; H04S 1/007

See application file for complete search history.

(56) References Cited

U.S. PATENT DOCUMENTS

| | | | |
|---|---|---|---|
| 7,050,972 | B2 | 5/2006 | Henn |
| 7,292,901 | B2 | 11/2007 | Baumgarte et al. |
| 7,742,912 | B2 | 6/2010 | Den Brinker |
| 7,813,513 | B2 | 10/2010 | Hotho |
| 7,840,411 | B2 | 11/2010 | Hotho |
| 8,170,882 | B2 | 5/2012 | Davis |
| 8,290,783 | B2 | 10/2012 | Schnell et al. |
| 8,498,421 | B2 | 7/2013 | Jung et al. |
| 8,655,670 | B2 | 2/2014 | Purnhagen |
| 8,804,967 | B2 | 8/2014 | Jung et al. |
| 8,885,836 | B2 | 11/2014 | McGrath |
| 9,166,864 | B1 | 10/2015 | Galligan |
| 9,311,922 | B2 | 4/2016 | Davis |
| 2002/0103637 | A1 | 8/2002 | Henn et al. |
| 2003/0220800 | A1 | 11/2003 | Budnikov |
| 2003/0236583 | A1 | 12/2003 | Baumgarte et al. |
| 2007/0081597 | A1 | 4/2007 | Disch |
| 2007/0140499 | A1 | 6/2007 | Davis |
| 2007/0174062 | A1 | 7/2007 | Mehrotra |
| 2008/0031463 | A1 | 2/2008 | Davis |
| 2008/0071549 | A1 | 3/2008 | Chong |
| 2009/0228285 | A1 | 9/2009 | Schnell |
| 2009/0234657 | A1 | 9/2009 | Takagi et al. |
| 2010/0223061 | A1 | 9/2010 | Ojanpera |
| 2010/0246832 | A1 | 9/2010 | Villemoes et al. |
| 2011/0040556 | A1 | 2/2011 | Moon |
| 2011/0085669 | A1 | 4/2011 | Jung |
| 2011/0202353 | A1 | 8/2011 | Neuendorf et al. |
| 2011/0202355 | A1 | 8/2011 | Grill |
| 2011/0255714 | A1 | 10/2011 | Neusinger |
| 2011/0282674 | A1 | 11/2011 | Ojanpera |
| 2012/0002818 | A1 | 1/2012 | Heiko |
| 2012/0047416 | A1 | 2/2012 | Oh |
| 2012/0082316 | A1 | 4/2012 | Thumpudi et al. |
| 2012/0128159 | A1 | 5/2012 | McGrath |
| 2013/0030819 | A1 | 1/2013 | Purnhagen |
| 2014/0016785 | A1* | 1/2014 | Neuendorf ............ G10L 19/008 381/23 |
| 2015/0187362 | A1 | 7/2015 | Davis |
| 2015/0279382 | A1 | 10/2015 | Atti |
| 2016/0012825 | A1 | 1/2016 | Kristofer |
| 2016/0027446 | A1 | 1/2016 | Purnhagen et al. |
| 2016/0140981 | A1 | 5/2016 | Niedermeier |

FOREIGN PATENT DOCUMENTS

| | | | |
|---|---|---|---|
| CN | 102667919 | | 9/2012 |
| CN | 101518083 | B | 11/2012 |
| CN | 102884570 | | 1/2013 |
| EP | 2375409 | A1 | 10/2011 |
| EP | 2477188 | | 7/2012 |
| EP | 2291008 | | 7/2013 |
| JP | 2000-122679 | | 4/2000 |
| JP | 2004-078183 | | 3/2004 |
| JP | 2006-323037 | | 11/2006 |
| JP | 2008-530616 | | 8/2008 |
| JP | 2010-503881 | | 2/2010 |
| JP | 2010-536299 | | 11/2010 |
| JP | 2010536299 | A | 11/2010 |
| JP | 2012-083790 | | 4/2012 |
| JP | 2012-521012 | | 9/2012 |
| JP | 2013-508770 | | 3/2013 |
| JP | 5400059 | | 1/2014 |
| JP | 2017-078858 | | 4/2017 |
| KR | 2012-0006010 | | 1/2012 |
| RU | 2473140 | | 1/2013 |
| WO | 03046891 | W | 6/2003 |
| WO | 2006/003891 | | 4/2008 |
| WO | 2010003545 | A1 | 1/2010 |
| WO | 2010/097748 | | 9/2010 |
| WO | 2010105926 | A2 | 9/2010 |
| WO | 2011048117 | A1 | 4/2011 |
| WO | 2011048792 | A1 | 4/2011 |
| WO | 2011/128138 | | 10/2011 |
| WO | 2012/025283 | | 3/2012 |
| WO | 2012/131253 | | 10/2012 |
| WO | 2012/146757 | | 11/2012 |
| WO | 2012/158333 | | 11/2012 |

OTHER PUBLICATIONS

Anonymous: A/52B, ATSC Standard, Digital Audio Compression Standard (AC-3, E-AC-3) revision B, Jun. 14, 2005.

ATSC Standard: Digital Audio Compression (AC-3), Advanced Television Systems Committee, Doc. 1/52:2012, Dec. 17, 2012.

Britanak, V. "On Properties, Relations, and Simplified Implementation of Filter Banks in the Dolby Digital (Plus) AC-3 Audio Coding Standards" IEEE Transactions on Audio, Speech, and Language Processing, vol. 19, Issue 5, pp. 1231-1241, Oct. 18, 2010.

Daniel, Adrien "Spatial Auditory Blurring and Applications to Multichannel Audio Coding" 2011, These pour obtenir le grade de docteur de L'Universite Pierre et Marie Curie, Ecole Doctorate Cerveau—Cognition—Comportement.

Herre, J. et al "MPEG Surround The ISO/MPEG Standard for Efficient and Compatible Multi-Channel Audio Coding" Audio Engineering Society Convention Paper, New York, USA, vol. 122, Jan. 1, 2007, pp. 1-23.

Herre, J. et al "MPEG-Surround—The ISO/MPEG Standard for Efficient and Compatible Multichannel Audio Coding" JAES vol. 56, Issue 11, pp. 932-955, Nov. 2008.

ISO/IEC 14496-3:2009 Information Technology—Coding of Audio-Visual Objects—Part 3: Audio, Sep. 1, 2009.

ISO/IEC FDIS 23003-3:2011 (E), Information Technology—MPEG Audio Technologies—Part 3: Unified Speech and Audio Coding. ISO/IEC JTC1/SC 29/WG 11, Sep. 20, 2011.

Liwei, Wang "Optimization and Implementation of MPEG-4 AAC Audio Decoder" A thesis submitted in Partial Fulfillment of the requirements for the Degree of Master of Engineering, Nov. 9, 2010.

Wabnik, S. et al "Packet Loss Concealment in Predictive Audio Coding" IEEE Workshop on Applications of Signal Processing to Audio and Acoustics, Oct. 16-19, 2005, New Paltz, NY, pp. 227-230.

(56) References Cited

OTHER PUBLICATIONS

Zhang, T. et al "On the Relationship of MDCT Transform Kernels in Dolby AC-3" International Conference on Audio, Language and Image Processing, published in Jul. 7-9, 2008, pp. 839-842.

* cited by examiner

AUDIO DECODER FOR INTERLEAVING SIGNALS

CROSS REFERENCE TO RELATED APPLICATIONS

This application is a continuation of U.S. patent application Ser. No. 17/463,192, filed Aug. 31, 2021, which is a continuation of U.S. patent application Ser. No. 16/593,830, filed Oct. 4, 2019, now U.S. Pat. No. 11,114,107, which is a divisional of U.S. patent application Ser. No. 15/641,033, filed Jul. 3, 2017, now U.S. Pat. No. 10,438,602, which is a continuation of U.S. patent application Ser. No. 15/227,283, filed Aug. 3, 2016, now U.S. Pat. No. 9,728,199, which is a continuation of U.S. patent application Ser. No. 14/772,001, filed Sep. 1, 2015, now U.S. Pat. No. 9,489,957, which is the National Stage of PCT Application No. PCT/EP2014/056852, filed Apr. 4, 2014, which claims priority to U.S. Provisional Application No. 61/808,680, filed Apr. 5, 2013, each of which is hereby incorporated by reference in its entirety.

TECHNICAL FIELD

The disclosure herein generally relates to multi-channel audio coding. In particular it relates to an encoder and a decoder for hybrid coding comprising parametric coding and discrete multi-channel coding.

BACKGROUND

In conventional multi-channel audio coding, possible coding schemes include discrete multi-channel coding or parametric coding such as MPEG Surround. The scheme used depends on the bandwidth of the audio system. Parametric coding methods are known to be scalable and efficient in terms of listening quality, which makes them particularly attractive in low bitrate applications. In high bitrate applications, the discrete multi-channel coding is often used. The existing distribution or processing formats and the associated coding techniques may be improved from the point of view of their bandwidth efficiency, especially in applications with a bitrate in between the low bitrate and the high bitrate.

U.S. Pat. No. 7,292,901 (Kroon et al.) relates to a hybrid coding method wherein a hybrid audio signal is formed from at least one downmixed spectral component and at least one unmixed spectral component. The method presented in that application may increase the capacity of an application having a certain bitrate, but further improvements may be needed to further increase the efficiency of an audio processing system.

BRIEF DESCRIPTION OF THE DRAWINGS

Example embodiments will now be described with reference to the accompanying drawings, on which.

All the figures are schematic and generally only show parts which are necessary in order to elucidate the disclosure, whereas other parts may be omitted or merely suggested. Unless otherwise indicated, like reference numerals refer to like parts in different figures.

DETAILED DESCRIPTION

Overview—Decoder

Figure 1:
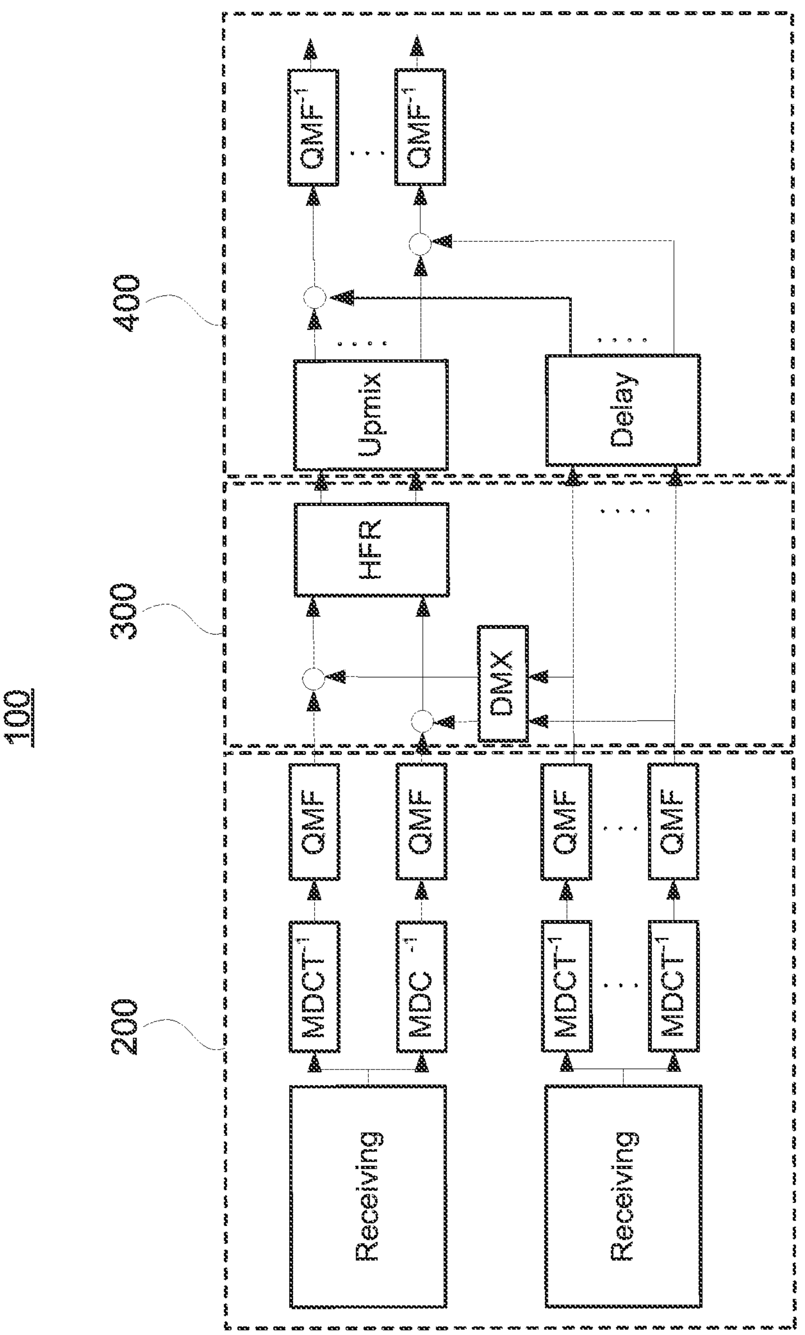
FIG. 1 is a generalized block diagram of a decoding system in accordance with an example embodiment.

As used herein, an audio signal may be a pure audio signal, an audio part of an audiovisual signal or multimedia signal or any of these in combination with metadata.

As used herein, downmixing of a plurality of signals means combining the plurality of signals, for example by forming linear combinations, such that a lower number of signals is obtained. The reverse operation to downmixing is referred to as upmixing that is, performing an operation on a lower number of signals to obtain a higher number of signals.

According to a first aspect, example embodiments propose methods, devices and computer program products, for reconstructing a multi-channel audio signal based on an input signal. The proposed methods, devices and computer program products may generally have the same features and advantages.

According to example embodiments, a decoder for a multi-channel audio processing system for reconstructing M encoded channels, wherein $M>2$, is provided. The decoder comprises a first receiving stage configured to receive N waveform-coded downmix signals comprising spectral coefficients corresponding to frequencies between a first and a second cross-over frequency, wherein $1<N<M$.

The decoder further comprises a second receiving stage configured to receive M waveform-coded signals comprising spectral coefficients corresponding to frequencies up to the first cross-over frequency, each of the M waveform-coded signals corresponding to a respective one of the M encoded channels.

The decoder further comprises a downmix stage downstreams of the second receiving stage configured to downmix the M waveform-coded signals into N downmix signals comprising spectral coefficients corresponding to frequencies up to the first cross-over frequency.

The decoder further comprises a first combining stage downstreams of the first receiving stage and the downmix stage configured to combine each of the N downmix signals received by the first receiving stage with a corresponding one of the N downmix signals from the downmix stage into N combined downmix signals.

The decoder further comprises a high frequency reconstructing stage downstreams of the first combining stage configured to extend each of the N combined downmix signals from the combining stage to a frequency range above the second cross-over frequency by performing high frequency reconstruction.

The decoder further comprising an upmix stage downstreams of the high frequency reconstructing stage configured to perform a parametric upmix of the N frequency extended signals from the high frequency reconstructing stage into M upmix signals comprising spectral coefficients corresponding to frequencies above the first cross-over frequency, each of the M upmix signals corresponding to one of the M encoded channels.

The decoder further comprises a second combining stage downstreams of the upmix stage and the second receiving stage configured to combine the M upmix signals from the upmix stage with the M waveform-coded signals received by the second receiving stage.

The M waveform-coded signals are purely waveform-coded signals with no parametric signals mixed in, i.e. they are a non-downmixed discrete representation of the processed multi-channel audio signal. An advantage of having the lower frequencies represented in these waveform-coded signals may be that the human ear is more sensitive to the part of the audio signal having low frequencies. By coding this part with a better quality, the overall impression of the decoded audio may increase.

An advantage of having at least two downmix signals is that this embodiment provides an increased dimensionality of the downmix signals compared to systems with only one downmix channel. According to this embodiment, a better decoded audio quality may thus be provided which may outweigh the gain in bitrate provided by a one downmix signal system.

An advantage of using hybrid coding comprising parametric downmix and discrete multi-channel coding is that this may improve the quality of the decoded audio signal for certain bit rates compared to using a conventional parametric coding approach, i.e. MPEG Surround with HE-AAC. At bitrates around 72 kilobits per second (kbps), the conventional parametric coding model may saturate, i.e. the quality of the decoded audio signal is limited by the shortcomings of the parametric model and not by lack of bits for coding. Consequently, for bitrates from around 72 kbps, it may be more beneficial to use bits on discretely waveform-coding lower frequencies. At the same time, the hybrid approach of using a parametric downmix and discrete multi-channel coding is that this may improve the quality of the decoded audio for certain bitrates, for example at or below 128 kbps, compared to using an approach where all bits are used on waveform-coding lower frequencies and using spectral band replication (SBR) for the remaining frequencies.

An advantage of having N waveform-coded downmix signals that only comprises spectral data corresponding to frequencies between the first cross-over frequency and a second cross-over frequency is that the required bit transmission rate for the audio signal processing system may be decreased. Alternatively, the bits saved by having a band pass filtered downmix signal may be used on waveform-coding lower frequencies, for example the sample frequency for those frequencies may be higher or the first cross-over frequency may be increased.

Since, as mentioned above, the human ear is more sensitive to the part of the audio signal having low frequencies, high frequencies, as the part of the audio signal having frequencies above the second cross-over frequency, may be recreated by high frequency reconstruction without reducing the perceived audio quality of the decoded audio signal.

A further advantage with the present embodiment may be that since the parametric upmix performed in the upmix stage only operates on spectral coefficients corresponding to frequencies above the first cross-over frequency, the complexity of the upmix is reduced.

According to another embodiment, the combining performed in the first combining stage, wherein each of the N waveform-coded downmix signals comprising spectral coefficients corresponding to frequencies between a first and a second cross-over frequency are combined with a corresponding one of the N downmix signals comprising spectral coefficients corresponding to frequencies up to the first cross-over frequency into N combined downmix, is performed in a frequency domain.

An advantage of this embodiment may be that the M waveform-coded signals and the N waveform-coded downmix signals can be coded by a waveform coder using overlapping windowed transforms with independent windowing for the M waveform-coded signals and the N waveform-coded downmix signals, respectively, and still be decodable by the decoder.

According to another embodiment, extending each of the N combined downmix signals to a frequency range above the second cross-over frequency in the high frequency reconstructing stage is performed in a frequency domain.

According to a further embodiment, the combining performed in the second combining step, i.e., the combining of the M upmix signals comprising spectral coefficients corresponding to frequencies above the first cross-over frequency with the M waveform-coded signals comprising spectral coefficients corresponding to frequencies up to the first cross-over frequency, is performed in a frequency domain. As mentioned above, an advantage of combining the signals in the QMF domain is that independent windowing of the overlapping windowed transforms used to code the signals in the MDCT domain may be used.

According to another embodiment, the performed parametric upmix of the N frequency extended combined downmix signals into M upmix signals at the upmix stage is performed in a frequency domain.

According to yet another embodiment, downmixing the M waveform-coded signals into N downmix signals comprising spectral coefficients corresponding to frequencies up to the first cross-over frequency is performed in a frequency domain.

According to an embodiment, the frequency domain is a Quadrature Mirror Filters, QMF, domain.

According to another embodiment, the downmixing performed in the downmixing stage, wherein the M waveform-coded signals is downmixed into N downmix signals comprising spectral coefficients corresponding to frequencies up to the first cross-over frequency, is performed in the time domain.

According to yet another embodiment, the first cross-over frequency depends on a bit transmission rate of the multi-channel audio processing system. This may result in that the available bandwidth is utilized to improve quality of the decoded audio signal since the part of the audio signal having frequencies below the first cross-over frequency is purely waveform-coded.

According to another embodiment, extending each of the N combined downmix signals to a frequency range above the second cross-over frequency by performing high frequency reconstruction at the high frequency reconstructions stage are performed using high frequency reconstruction parameters. The high frequency reconstruction parameters may be received by the decoder, for example at the receiving stage and then sent to a high frequency reconstruction stage. The high frequency reconstruction may for example comprise performing spectral band replication, SBR.

According to another embodiment, the parametric upmix in the upmixing stage is done with use of upmix parameters. The upmix parameters are received by the encoder, for example at the receiving stage and sent to the upmixing stage. A decorrelated version of the N frequency extended combined downmix signals is generated and the N frequency extended combined downmix signals and the decorrelated version of the N frequency extended combined downmix signals are subjected to a matrix operation. The parameters of the matrix operation are given by the upmix parameters.

According to another embodiment, the received N waveform-coded downmix signals in the first receiving stage and the received M waveform-coded signals in the second receiving stage are coded using overlapping windowed transforms with independent windowing for the N waveform-coded downmix signals and the M waveform-coded signals, respectively.

An advantage of this may be that this allows for an improved coding quality and thus an improved quality of the decoded multi-channel audio signal. For example, if a transient is detected in the higher frequency bands at a certain point in time, the waveform coder may code this particular time frame with a shorter window sequence while for the lower frequency band, the default window sequence may be kept.

According to embodiments, the decoder may comprise a third receiving stage configured to receive a further waveform-coded signal comprising spectral coefficients corresponding to a subset of the frequencies above the first cross-over frequency. The decoder may further comprise an interleaving stage downstream of the upmix stage. The interleaving stage may be configured to interleave the further waveform-coded signal with one of the M upmix signals. The third receiving stage may further be configured to receive a plurality of further waveform-coded signals and the interleaving stage may further be configured to interleave the plurality of further waveform-coded signal with a plurality of the M upmix signals.

This is advantageous in that certain parts of the frequency range above the first cross-over frequency which are difficult to reconstruct parametrically from the downmix signals may be provided in a waveform-coded form for interleaving with the parametrically reconstructed upmix signals.

In one exemplary embodiment, the interleaving is performed by adding the further waveform-coded signal with one of the M upmix signals. According to another exemplary embodiment, the step of interleaving the further waveform-coded signal with one of the M upmix signals comprises replacing one of the M upmix signals with the further waveform-coded signal in the subset of the frequencies above the first cross-over frequency corresponding to the spectral coefficients of the further waveform-coded signal.

According to exemplary embodiments, the decoder may further be configured to receive a control signal, for example by the third receiving stage. The control signal may indicate how to interleave the further waveform-coded signal with one of the M upmix signals, wherein the step of interleaving the further waveform-coded signal with one of the M upmix signals is based on the control signal. Specifically, the control signal may indicate a frequency range and a time range, such as one or more time/frequency tiles in a QMF domain, for which the further waveform-coded signal is to be interleaved with one of the M upmix signals. Accordingly, Interleaving may occur in time and frequency within one channel.

An advantage of this is that time ranges and frequency ranges can be selected which do not suffer from aliasing or start-up/fade-out problems of the overlapping windowed transform used to code the waveform-coded signals.

In accordance with some embodiments, a method for decoding an encoded audio bitstream in an audio processing system is disclosed. The method includes extracting from the encoded audio bitstream a first waveform-coded signal including spectral coefficients corresponding to frequencies up to a first cross-over frequency and performing parametric decoding at a second cross-over frequency to generate a reconstructed signal. The second cross-over frequency is above the first cross-over frequency and the parametric decoding uses reconstruction parameters derived from the encoded audio bitstream to generate the reconstructed signal. The method further includes extracting from the encoded audio bitstream a second waveform-coded signal including spectral coefficients corresponding to a subset of frequencies above the first cross-over frequency and interleaving the second waveform-coded signal with the reconstructed signal to produce an interleaved signal. The interleaved signal is then combined with the first waveform-coded signal.

Numerous variations also exist. For example, the first cross-over frequency may depend on a bit transmission rate of the audio processing system and the interleaving may include (i) adding the second waveform-coded signal with the reconstructed signal, (ii) combining the second waveform-coded signal with the reconstructed signal, or (iii) replacing the reconstructed signal with the second waveform-coded signal. The combining the interleaved signal with the first waveform-coded signal may be performed in a frequency domain, or the performing parametric decoding at the second cross-over frequency to generate the reconstructed signal may be performed in a frequency domain. The parametric decoding may include either (i) parametric upmixing using upmix parameters or (ii) high frequency reconstruction using high frequency reconstruction parameters, such as spectral band replication, SBR. The method may further comprising receiving a control signal used during the interleaving to produce the interleaved signal. The control signal may indicate how to interleave the second waveform-coded signal with the reconstructed signal by specifying either a frequency range or a time range for the interleaving. A first value of the control signal may indicate that interleaving is performed for a respective frequency region. The interleaving may also be performed before the combining. The interleaving and the combining may also be combined into a single stage or operation. The first waveform-coded signal and the second waveform-coded signal may include a signal representing a waveform of an audio signal in the frequency or time domain.

Overview—Encoder

According to a second aspect, example embodiments propose methods, devices and computer program products for encoding a multi-channel audio signal based on an input signal.

The proposed methods, devices and computer program products may generally have the same features and advantages.

Advantages regarding features and setups as presented in the overview of the decoder above may generally be valid for the corresponding features and setups for the encoder.

According to the example embodiments, an encoder for a multi-channel audio processing system for encoding M channels, wherein M>2, is provided.

The encoder comprises a receiving stage configured to receive M signals corresponding to the M channels to be encoded.

The encoder further comprises first waveform-coding stage configured to receive the M signals from the receiving stage and to generate M waveform-coded signals by individually waveform-coding the M signals for a frequency range corresponding to frequencies up to a first cross-over frequency, whereby the M waveform-coded signals comprise spectral coefficients corresponding to frequencies up to the first cross-over frequency.

The encoder further comprises a downmixing stage configured to receive the M signals from the receiving stage and to downmix the M signals into N downmix signals, wherein 1<N<M.

The encoder further comprises high frequency reconstruction encoding stage configured to receive the N downmix signals from the downmixing stage and to subject the N downmix signals to high frequency reconstruction encoding, whereby the high frequency reconstruction encoding stage is configured to extract high frequency reconstruction parameters which enable high frequency reconstruction of the N downmix signals above a second cross-over frequency.

The encoder further comprises a parametric encoding stage configured to receive the M signals from the receiving stage and the N downmix signals from the downmixing stage, and to subject the M signals to parametric encoding for the frequency range corresponding to frequencies above the first cross-over frequency, whereby the parametric encoding stage is configured to extract upmix parameters which enable upmixing of the N downmix signals into M reconstructed signals corresponding to the M channels for the frequency range above the first cross-over frequency.

The encoder further comprises a second waveform-coding stage configured to receive the N downmix signals from the downmixing stage and to generate N waveform-coded downmix signals by waveform-coding the N downmix signals for a frequency range corresponding to frequencies between the first and the second cross-over frequency, whereby the N waveform-coded downmix signals comprise spectral coefficients corresponding to frequencies between the first cross-over frequency and the second cross-over frequency.

According to an embodiment, subjecting the N downmix signals to high frequency reconstruction encoding in the high frequency reconstruction encoding stage is performed in a frequency domain, preferably a Quadrature Mirror Filters, QMF, domain.

According to a further embodiment, subjecting the M signals to parametric encoding in the parametric encoding stage is performed in a frequency domain, preferably a Quadrature Mirror Filters, QMF, domain.

According to yet another embodiment, generating M waveform-coded signals by individually waveform-coding the M signals in the first waveform-coding stage comprises applying an overlapping windowed transform to the M signals, wherein different overlapping window sequences are used for at least two of the M signals.

According to embodiments, the encoder may further comprise a third wave-form encoding stage configured to generate a further waveform-coded signal by waveform-coding one of the M signals for a frequency range corresponding to a subset of the frequency range above the first cross-over frequency.

According to embodiments, the encoder may comprise a control signal generating stage. The control signal generating stage is configured to generate a control signal indicating how to interleave the further waveform-coded signal with a parametric reconstruction of one of the M signals in a decoder. For example, the control signal may indicate a frequency range and a time range for which the further waveform-coded signal is to be interleaved with one of the M upmix signals.

EXAMPLE EMBODIMENTS

FIG. 1 is a generalized block diagram of a decoder 100 in a multi-channel audio processing system for reconstructing M encoded channels. The decoder 100 comprises three conceptual parts 200, 300, 400 that will be explained in greater detail in conjunction with FIG. 2-4 below. In first conceptual part 200, the encoder receives N waveform-coded downmix signals and M waveform-coded signals representing the multi-channel audio signal to be decoded, wherein 1<N<M. In the illustrated example, N is set to 2. In the second conceptual part 300, the M waveform-coded signals are downmixed and combined with the N waveform-coded downmix signals. High frequency reconstruction (HFR) is then performed for the combined downmix signals. In the third conceptual part 400, the high frequency reconstructed signals are upmixed, and the M waveform-coded signals are combined with the upmix signals to reconstruct M encoded channels.

Figure 2:
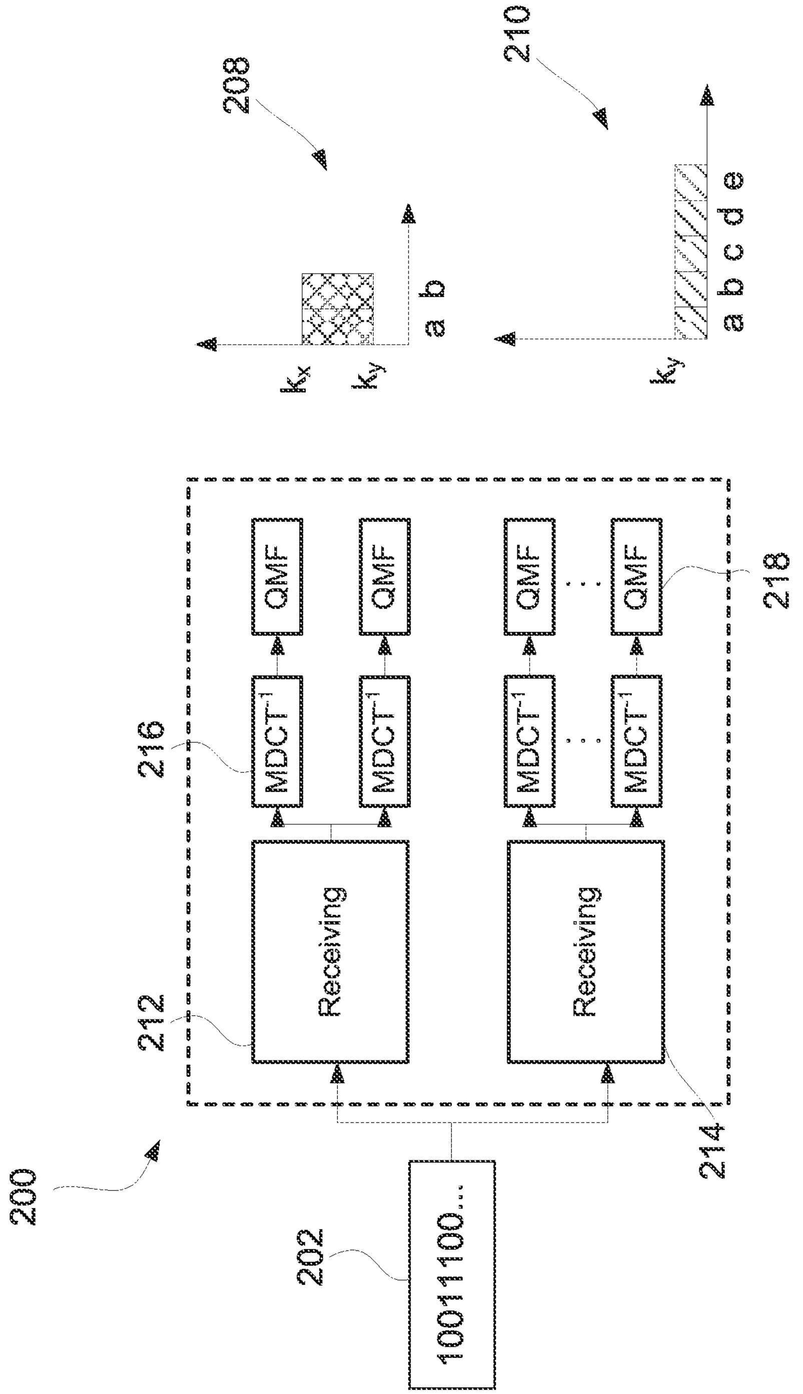
FIG. 2 illustrates a first part of the decoding system in FIG. 1.
Figure 3:
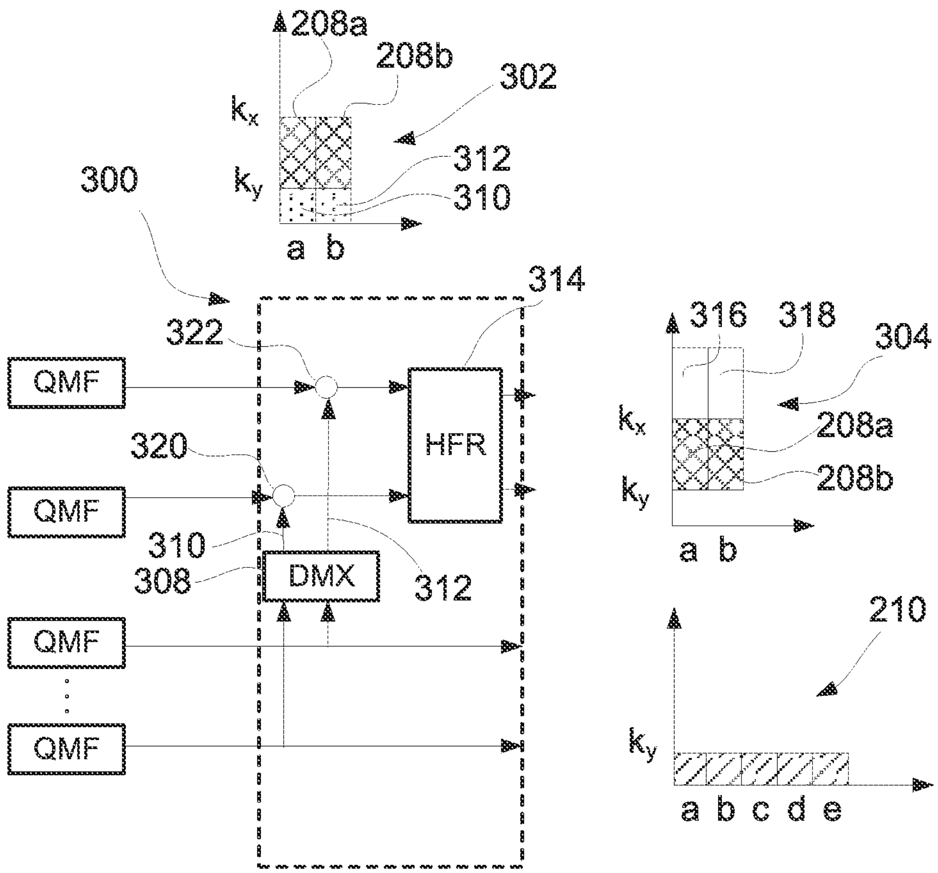
FIG. 3 illustrates a second part of the decoding system in FIG. 1.
Figure 4:
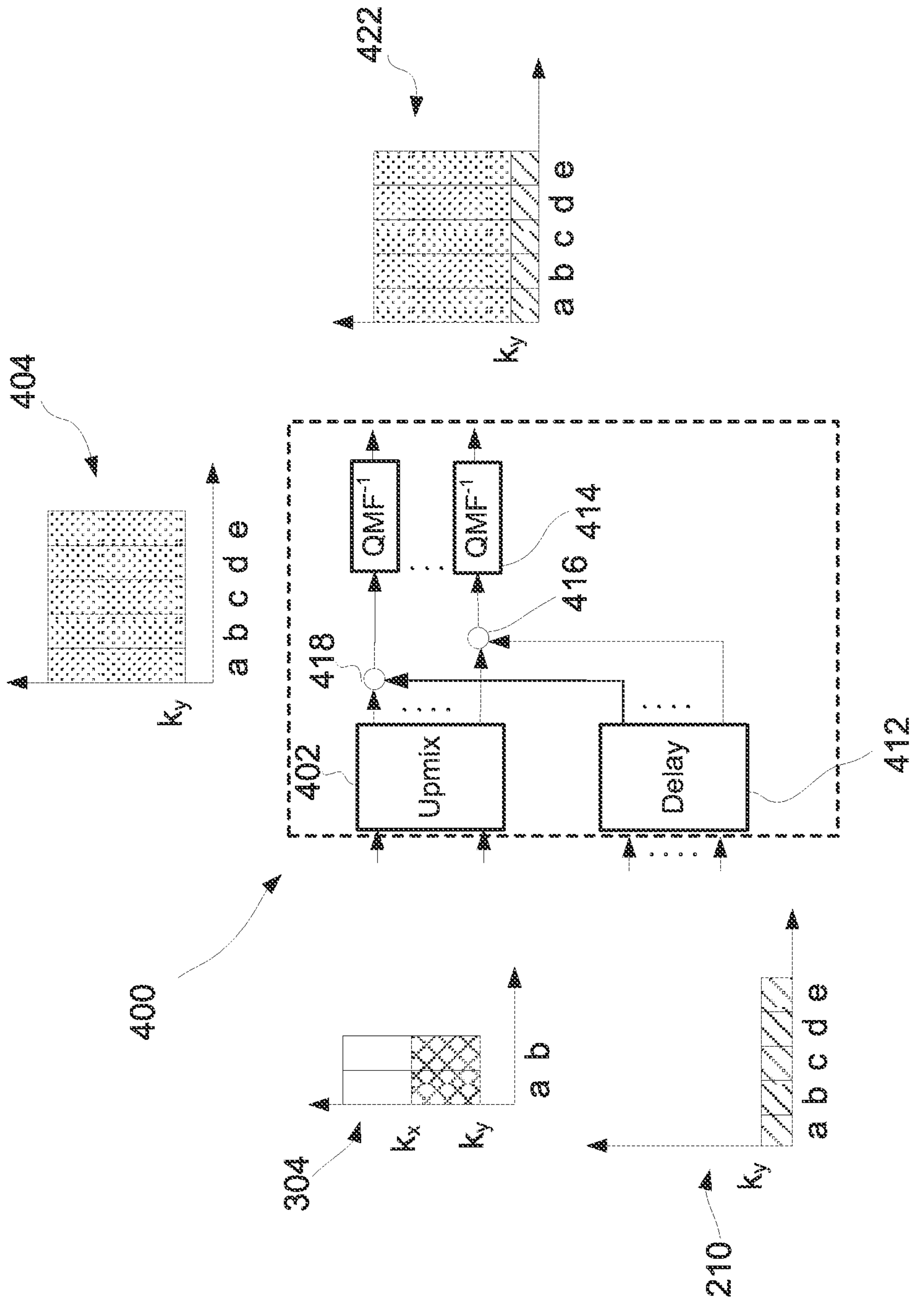
FIG. 4 illustrates a third part of the decoding system in FIG. 1.

In the exemplary embodiment described in conjunction with FIG. 2-4, the reconstruction of an encoded 5.1 surround sound is described. It may be noted that the low frequency effect signal is not mentioned in the described embodiment or in the drawings. This does not mean that any low frequency effects are neglected. The low frequency effects (Lfe) are added to the reconstructed 5 channels in any suitable way well known by a person skilled in the art. It may also be noted that the described decoder is equally well suited for other types of encoded surround sound such as 7.1 or 9.1 surround sound.

FIG. 2 illustrates the first conceptual part 200 of the decoder 100 in FIG. 1. The decoder comprises two receiving stages 212, 214. In the first receiving stage 212, a bit-stream 202 is decoded and dequantized into two waveform-coded downmix signals 208*a-b*. Each of the two waveform-coded downmix signals 208*a-b* comprises spectral coefficients corresponding to frequencies between a first cross-over frequency $k_y$ and a second cross-over frequency $k_x$.

In the second receiving stage 212, the bit-stream 202 is decoded and dequantized into five waveform-coded signals 210*a-e*. Each of the five waveform-coded downmix signals 208*a-e* comprises spectral coefficients corresponding to frequencies up to the first cross-over frequency $k_x$.

By way of example, the signals 210*a-e* comprises two channel pair elements and one single channel element for the centre. The channel pair elements may for example be a combination of the left front and left surround signal and a combination of the right front and the right surround signal. A further example is a combination of the left front and the right front signals and a combination of the left surround and right surround signal. These channel pair elements may for example be coded in a sum-and-difference format. All five signals 210*a-e* may be coded using overlapping windowed transforms with independent windowing and still be decodable by the decoder. This may allow for an improved coding quality and thus an improved quality of the decoded signal.

By way of example, the first cross-over frequency $k_y$ is 1.1 kHz. By way of example, the second cross-over frequency $k_x$ lies within the range of is 5.6-8 kHz. It should be noted that the first cross-over frequency $k_y$ can vary, even on an individual signal basis, i.e. the encoder can detect that a signal component in a specific output signal may not be faithfully reproduced by the stereo downmix signals 208*a-b* and can for that particular time instance increase the bandwidth, i.e. the first cross-over frequency $k_y$, of the relevant waveform coded signal, i.e. 210*a-e*, to do proper wavefrom coding of the signal component.

As will be described later on in this description, the remaining stages of the encoder 100 typically operates in the Quadrature Mirror Filters (QMF) domain. For this reason, each of the signals 208*a-b*, 210*a-e* received by the first and second receiving stage 212, 214, which are received in a modified discrete cosine transform (MDCT) form, are transformed into the time domain by applying an inverse MDCT 216. Each signal is then transformed back to the frequency domain by applying a QMF transform 218.

In FIG. 3, the five waveform-coded signals 210 are downmixed to two downmix signals 310, 312 comprising spectral coefficients corresponding to frequencies up to the first cross-over frequency $k_y$ at a downmix stage 308. These downmix signals 310, 312 may be formed by performing a downmix on the low pass multi-channel signals 210*a-e* using the same downmixing scheme as was used in an encoder to create the two downmix signals 208*a-b* shown in FIG. 2.

The two new downmix signals 310, 312 are then combined in a first combing stage 320, 322 with the corresponding downmix signal 208*a-b* to form a combined downmix signals 302*a-b*. Each of the combined downmix signals 302*a-b* thus comprises spectral coefficients corresponding to frequencies up to the first cross-over frequency $k_y$ originating from the downmix signals 310, 312 and spectral coefficients corresponding to frequencies between the first cross-over frequency $k_y$ and the second cross-over frequency $k_x$ originating from the two waveform-coded downmix signals 208*a-b* received in the first receiving stage 212 (shown in FIG. 2).

The encoder further comprises a high frequency reconstruction (HFR) stage 314. The HFR stage is configured to extend each of the two combined downmix signals 302*a-b* from the combining stage to a frequency range above the second cross-over frequency $k_x$ by performing high frequency reconstruction. The performed high frequency reconstruction may according to some embodiments comprise performing spectral band replication, SBR. The high frequency reconstruction may be done by using high frequency reconstruction parameters which may be received by the HFR stage 314 in any suitable way.

The output from the high frequency reconstruction stage 314 is two signals 304*a-b* comprising the downmix signals 208*a-b* with the HFR extension 316, 318 applied. As described above, the HFR stage 314 is performing high frequency reconstruction based on the frequencies present in the input signal 210*a-e* from the second receiving stage 214 (shown in FIG. 2) combined with the two downmix signals 208*a-b*. Somewhat simplified, the HFR range 316, 318 comprises parts of the spectral coefficients from the downmix signals 310, 312 that has been copied up to the HFR range 316, 318. Consequently, parts of the five waveform-coded signals 210*a-e* will appear in the HFR range 316, 318 of the output 304 from the HFR stage 314.

It should be noted that the downmixing at the downmixing stage 308 and the combining in the first combining stage 320, 322 prior to the high frequency reconstruction stage 314, can be done in the time-domain, i.e. after each signal has transformed into the time domain by applying an inverse modified discrete cosine transform (MDCT) 216 (shown in FIG. 2). However, given that the waveform-coded signals 210*a-e* and the waveform-coded downmix signals 208*a-b* can be coded by a waveform coder using overlapping windowed transforms with independent windowing, the signals 210*a-e* and 208*a-b* may not be seamlessly combined in a time domain. Thus, a better controlled scenario is attained if at least the combining in the first combining stage 320, 322 is done in the QMF domain.

FIG. 4 illustrates the third and final conceptual part 400 of the encoder 100. The output 304 from the HFR stage 314 constitutes the input to an upmix stage 402. The upmix stage 402 creates a five signal output 404*a-e* by performing parametric upmix on the frequency extended signals 304*a-b*. Each of the five upmix signals 404*a-e* corresponds to one of the five encoded channels in the encoded 5.1 surround sound for frequencies above the first cross-over frequency $k_y$. According to an exemplary parametric upmix procedure, the upmix stage 402 first receives parametric mixing parameters. The upmix stage 402 further generates decorrelated versions of the two frequency extended combined downmix signals 304*a-b*. The upmix stage 402 further subjects the two frequency extended combined downmix signals 304*a-b* and the decorrelated versions of the two frequency extended combined downmix signals 304*a-b* to a matrix operation, wherein the parameters of the matrix operation are given by the upmix parameters. Alternatively, any other parametric upmixing procedure known in the art may be applied. Applicable parametric upmixing procedures are described for example in "*MPEG Surround—The ISO/MPEG Standard for Efficient and Compatible Multichannel Audio Coding*" (Herre et al., Journal of the Audio Engineering Society, Vol. 56, No. Nov. 11, 2008).

The output 404*a-e* from the upmix stage 402 does thus not comprising frequencies below the first cross-over frequency $k_y$. The remaining spectral coefficients corresponding to frequencies up to the first cross-over frequency $k_y$ exists in the five waveform-coded signals 210*a-e* that has been delayed by a delay stage 412 to match the timing of the upmix signals 404.

The encoder 100 further comprises a second combining stage 416, 418. The second combining stage 416, 418 is configured to combine the five upmix signals 404*a-e* with the five waveform-coded signals 210*a-e* which was received by the second receiving stage 214 (shown in FIG. 2).

It may be noted that any present Lfe signal may be added as a separate signal to the resulting combined signal 422. Each of the signals 422 is then transformed to the time domain by applying an inverse QMF transform 420. The output from the inverse QMF transform 414 is thus the fully decoded 5.1 channel audio signal.

Figure 6:
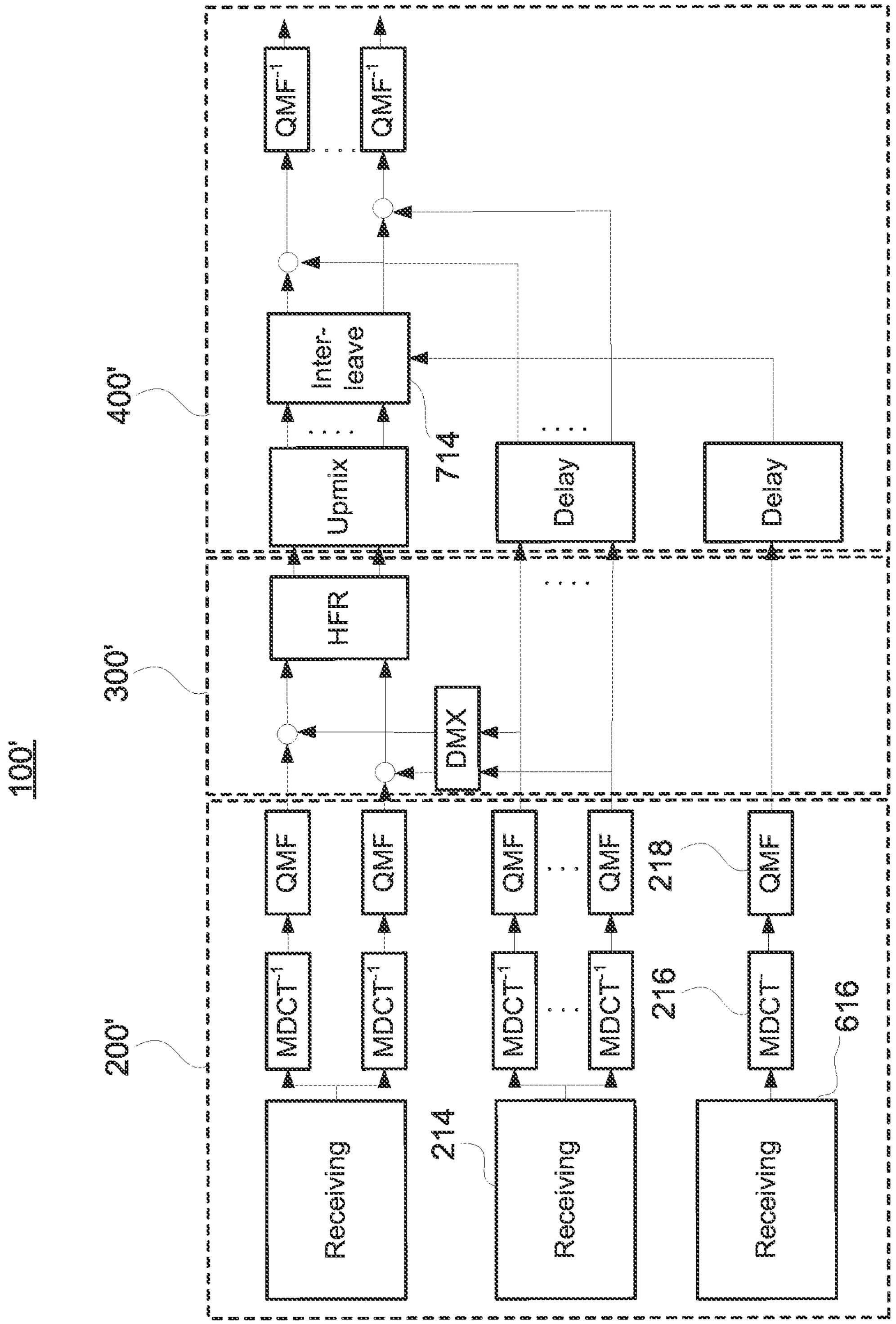
FIG. 6 is a generalized block diagram of a decoding system in accordance with an example embodiment.

FIG. 6 illustrates a decoding system 100' being a modification of the decoding system 100 of FIG. 1. The decoding system 100' has conceptual parts 200', 300', and 400' corresponding to the conceptual parts 100, 200, and 300 of FIG. 1. The difference between the decoding system 100' of FIG. 6 and the decoding system of FIG. 1 is that there is a third receiving stage 616 in the conceptual part 200' and an interleaving stage 714 in the third conceptual part 400'.

The third receiving stage 616 is configured to receive a further waveform-coded signal. The further waveform-coded signal comprises spectral coefficients corresponding to a subset of the frequencies above the first cross-over frequency. The further waveform-coded signal may be transformed into the time domain by applying an inverse MDCT 216. It may then be transformed back to the frequency domain by applying a QMF transform 218.

It is to be understood that the further waveform-coded signal may be received as a separate signal. However, the further waveform-coded signal may also form part of one or more of the five waveform-coded signals 210*a-e*. In other words, the further waveform-coded signal may be jointly coded with one or more of the five waveform-coded signals 201*a-e*, for instance using the same MCDT transform. If so, the third receiving stage 616 corresponds to the second receiving stage, i.e. the further waveform-coded signal is received together with the five waveform-coded signals 210*a-e* via the second receiving stage 214.

Figure 7:
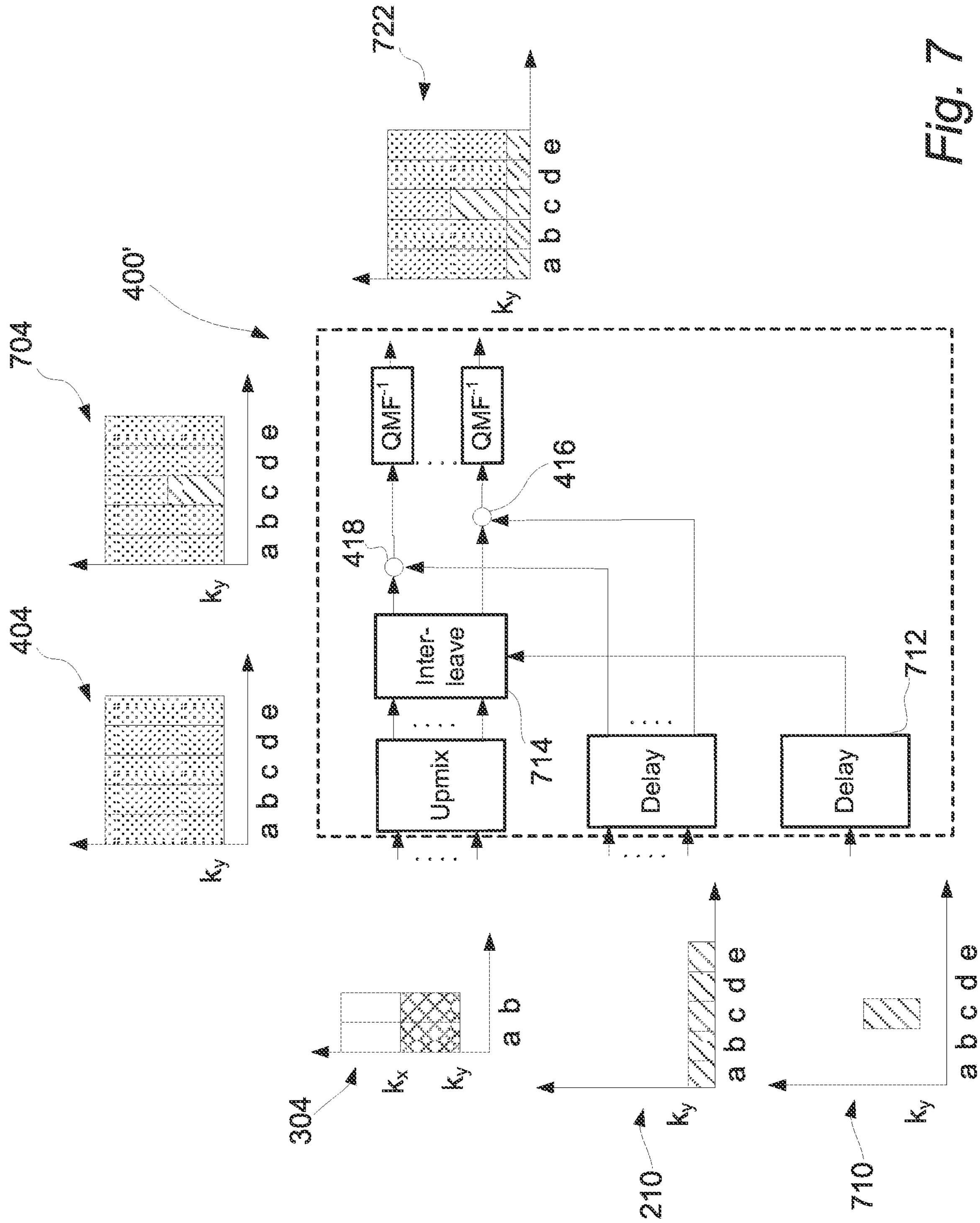
FIG. 7 illustrates a third part of the decoding system of FIG. 6.

FIG. 7 illustrates the third conceptual part 300' of the decoder 100' of FIG. 6 in more detail. The further waveform-coded signal 710 is input to the third conceptual part 400' in addition to the high frequency extended downmix-signals 304*a-b* and the five waveform-coded signals 210*a-e*. In the illustrated example, the further waveform-coded signal 710 corresponds to the third channel of the five channels. The further waveform-coded signal 710 further comprises spectral coefficients corresponding to a frequency interval starting from the first cross-over frequency $k_y$. However, the form of the subset of the frequency range above the first cross-over frequency covered by the further waveform-coded signal 710 may of course vary in different embodiments. It is also to be noted that a plurality of waveform-coded signals 710*a-e* may be received, wherein the different waveform-coded signals may correspond to different output channels. The subset of the frequency range covered by the plurality of further waveform-coded signals 710*a-e* may vary between different ones of the plurality of further waveform-coded signals 710*a-e*.

The further waveform-coded signal 710 may be delayed by a delay stage 712 to match the timing of the upmix signals 404 being output from the upmix stage 402. The upmix signals 404 and the further waveform-coded signal 710 are then input to an interleave stage 714. The interleave stage 714 interleaves, i.e., combines the upmix signals 404 with the further waveform-coded signal 710 to generate an interleaved signal 704. In the present example, the interleaving stage 714 thus interleaves the third upmix signal 404*c* with the further waveform-coded signal 710. The interleaving may be performed by adding the two signals together. However, typically, the interleaving is performed by replacing the upmix signals 404 with the further waveform-coded signal 710 in the frequency range and time range where the signals overlap.

The interleaved signal 704 is then input to the second combining stage, 416, 418, where it is combined with the waveform-coded signals 201*a-e* to generate an output signal 722 in the same manner as described with reference to FIG. 4. It is to be noted that the order of the interleave stage 714 and the second combining stage 416, 418 may be reversed so that the combining is performed before the interleaving.

Also, in the situation where the further waveform-coded signal 710 forms part of one or more of the five waveform-coded signals 210*a-e*, the second combining stage 416, 418, and the interleave stage 714 may be combined into a single stage. Specifically, such a combined stage would use the spectral content of the five waveform-coded signals 210*a-e* for frequencies up to the first cross-over frequency $k_y$. For frequencies above the first cross-over frequency, the combined stage would use the upmix signals 404 interleaved with the further waveform-coded signal 710.

The interleave stage 714 may operate under the control of a control signal. For this purpose the decoder 100' may receive, for example via the third receiving stage 616, a control signal which indicates how to interleave the further waveform-coded signal with one of the M upmix signals. For example, the control signal may indicate the frequency range and the time range for which the further waveform-coded signal 710 is to be interleaved with one of the upmix signals 404. For instance, the frequency range and the time range may be expressed in terms of time/frequency tiles for which the interleaving is to be made. The time/frequency tiles may be time/frequency tiles with respect to the time/frequency grid of the QMF domain where the interleaving takes place.

The control signal may use vectors, such as binary vectors, to indicate the time/frequency tiles for which interleaving are to be made. Specifically, there may be a first vector relating to a frequency direction, indicating the frequencies for which interleaving is to be performed. The indication may for example be made by indicating a logic one for the corresponding frequency interval in the first vector. There may also be a second vector relating to a time direction, indicating the time intervals for which interleaving are to be performed. The indication may for example be made by indicating a logic one for the corresponding time interval in the second vector. For this purpose, a time frame is typically divided into a plurality of time slots, such that the time indication may be made on a sub-frame basis. By intersecting the first and the second vectors, a time/frequency matrix may be constructed. For example, the time/frequency matrix may be a binary matrix comprising a logic one for each time/frequency tile for which the first and the second vectors indicate a logic one. The interleave stage 714 may then use the time/frequency matrix upon performing interleaving, for instance such that one or more of the upmix signals 704 are replaced by the further wave-form coded signal 710 for the time/frequency tiles being indicated, such as by a logic one, in the time/frequency matrix.

It is noted that the vectors may use other schemes than a binary scheme to indicate the time/frequency tiles for which interleaving are to be made. For example, the vectors could indicate by means of a first value such as a zero that no interleaving is to be made, and by second value that interleaving is to be made with respect to a certain channel identified by the second value.

Figure 5:
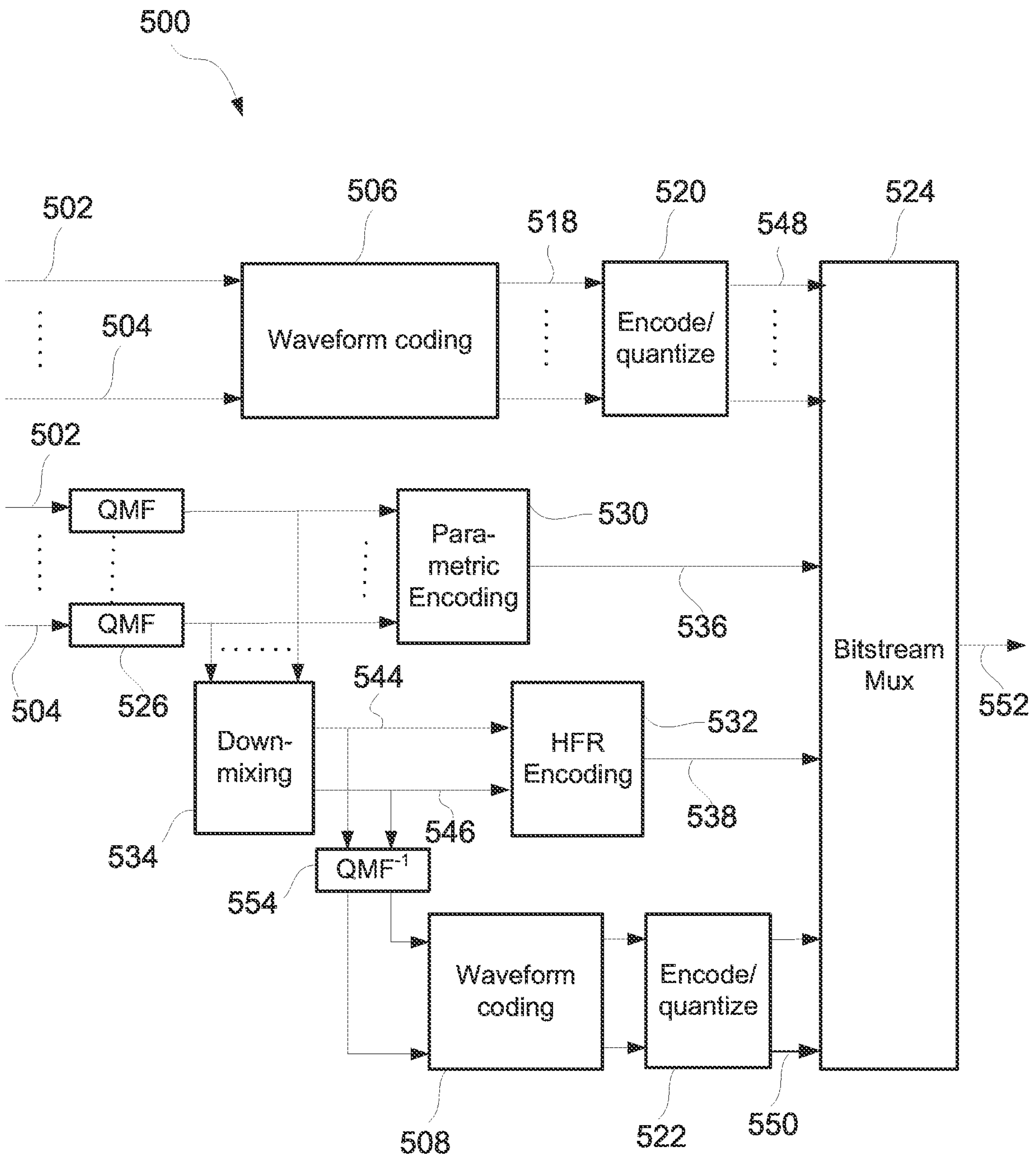
FIG. 5 is a generalized block diagram of an encoding system in accordance with an example embodiment.

FIG. 5 shows by way of example a generalized block diagram of an encoding system 500 for a multi-channel audio processing system for encoding M channels in accordance with an embodiment.

In the exemplary embodiment described in FIG. 5, the encoding of a 5.1 surround sound is described. Thus, in the illustrated example, M is set to five. It may be noted that the low frequency effect signal is not mentioned in the described embodiment or in the drawings. This does not mean that any low frequency effects are neglected. The low frequency effects (Lfe) are added to the bitstream 552 in any suitable way well known by a person skilled in the art. It may also be noted that the described encoder is equally well suited for encoding other types of surround sound such as 7.1 or 9.1 surround sound. In the encoder 500, five signals 502, 504 are received at a receiving stage (not shown). The encoder 500 comprises a first waveform-coding stage 506 configured to receive the five signals 502, 504 from the receiving stage and to generate five waveform-coded signals 518 by individually waveform-coding the five signals 502, 504. The waveform-coding stage 506 may for example subject each of the five received signals 502, 504 to a MDCT transform. As discussed with respect to the decoder, the encoder may choose to encode each of the five received signals 502, 504 using a MDCT transform with independent windowing. This may allow for an improved coding quality and thus an improved quality of the decoded signal.

The five waveform-coded signals 518 are waveform-coded for a frequency range corresponding to frequencies up to a first cross-over frequency. Thus, the five waveform-coded signals 518 comprise spectral coefficients corresponding to frequencies up to the first cross-over frequency. This may be achieved by subjecting each of the five waveform-coded signals 518 to a low pass filter. The five waveform-coded signals 518 are then quantized 520 according to a psychoacoustic model. The psychoacoustic model are configure to as accurate as possible, considering the available bit rate in the multi-channel audio processing system, reproducing the encoded signals as perceived by a listener when decoded on a decoder side of the system.

As discussed above, the encoder 500 performs hybrid coding comprising discrete multi-channel coding and parametric coding. The discrete multi-channel coding is performed by in the waveform-coding stage 506 on each of the input signals 502, 504 for frequencies up to the first cross-over frequency as described above. The parametric coding is performed to be able to, on a decoder side, reconstruct the five input signals 502, 504 from N downmix signals for frequencies above the first cross-over frequency. In the illustrated example in FIG. 5, N is set to 2. The downmixing of the five input signals 502, 504 is performed in a downmixing stage 534. The downmixing stage 534 advantageously operates in a QMF domain. Therefore, prior to being input to the downmixing stage 534, the five signals 502, 504 are transformed to a QMF domain by a QMF analysis stage 526. The downmixing stage performs a linear downmixing operation on the five signals 502, 504 and outputs two downmix signal 544, 546.

These two downmix signals 544, 546 are received by a second waveform-coding stage 508 after they have been transformed back to the time domain by being subjected to an inverse QMF transform 554. The second waveform-coding stage 508 is generating two waveform-coded downmix signals by waveform-coding the two downmix signals 544, 546 for a frequency range corresponding to frequencies between the first and the second cross-over frequency. The waveform-coding stage 508 may for example subject each of the two downmix signals to a MDCT transform. The two waveform-coded downmix signals thus comprise spectral coefficients corresponding to frequencies between the first cross-over frequency and the second cross-over frequency. The two waveform-coded downmix signals are then quantized 522 according to the psychoacoustic model.

To be able to reconstruct the frequencies above the second cross-over frequency on a decoder side, high frequency reconstruction, HFR, parameters 538 are extracted from the two downmix signals 544, 546. These parameters are extracted at a HFR encoding stage 532.

To be able to reconstruct the five signals from the two downmix signals 544, 546 on a decoder side, the five input signals 502, 504 are received by the parametric encoding stage 530. The five signals 502, 504 are subjected to parametric encoding for the frequency range corresponding to frequencies above the first cross-over frequency. The parametric encoding stage 530 is then configured to extract upmix parameters 536 which enable upmixing of the two downmix signals 544, 546 into five reconstructed signals corresponding to the five input signals 502, 504 (i.e. the five channels in the encoded 5.1 surround sound) for the frequency range above the first cross-over frequency. It may be noted that the upmix parameters 536 is only extracted for frequencies above the first cross-over frequency. This may reduce the complexity of the parametric encoding stage 530, and the bitrate of the corresponding parametric data.

It may be noted that the downmixing 534 can be accomplished in the time domain. In that case the QMF analysis stage 526 should be positioned downstreams the downmixing stage 534 prior to the HFR encoding stage 532 since the HRF encoding stage 532 typically operates in the QMF domain. In this case, the inverse QMF stage 554 can be omitted.

The encoder 500 further comprises a bitstream generating stage, i.e., bitstream multiplexer, 524. According to the exemplary embodiment of the encoder 500, the bitstream generating stage is configured to receive the five encoded and quantized signal 548, the two parameters signals 536, 538 and the two encoded and quantized downmix signals 550. These are converted into a bitstream 552 by the bitstream generating stage 524, to further be distributed in the multi-channel audio system.

In the described multi-channel audio system, a maximum available bit rate often exists, for example when streaming audio over the internet. Since the characteristics of each time frame of the input signals 502, 504 differs, the exact same allocation of bits between the five waveform-coded signals 548 and the two downmix waveform-coded signals 550 may not be used. Furthermore, each individual signal 548 and 550 may need more or less allocated bits such that the signals can be reconstructed according to the psychoacoustic model. According to an exemplary embodiment, the first and the second waveform-coding stage 506, 508 share a common bit reservoir. The available bits per encoded frame are first distributed between the first and the second waveform-encoding stage 506, 508 depending on the characteristics of the signals to be encoded and the present psychoacoustic model. The bits are then distributed between the individual signals 548, 550 as described above. The number of bits used for the high frequency reconstruction parameters 538 and the upmix parameters 536 are of course taken in account when distributing the available bits. Care is taken to adjust the psychoacoustic model for the first and the second waveform-coding stage 506, 508 for a perceptually smooth transition around the first cross-over frequency with respect to the number of bits allocated at the particular time frame.

Figure 8:
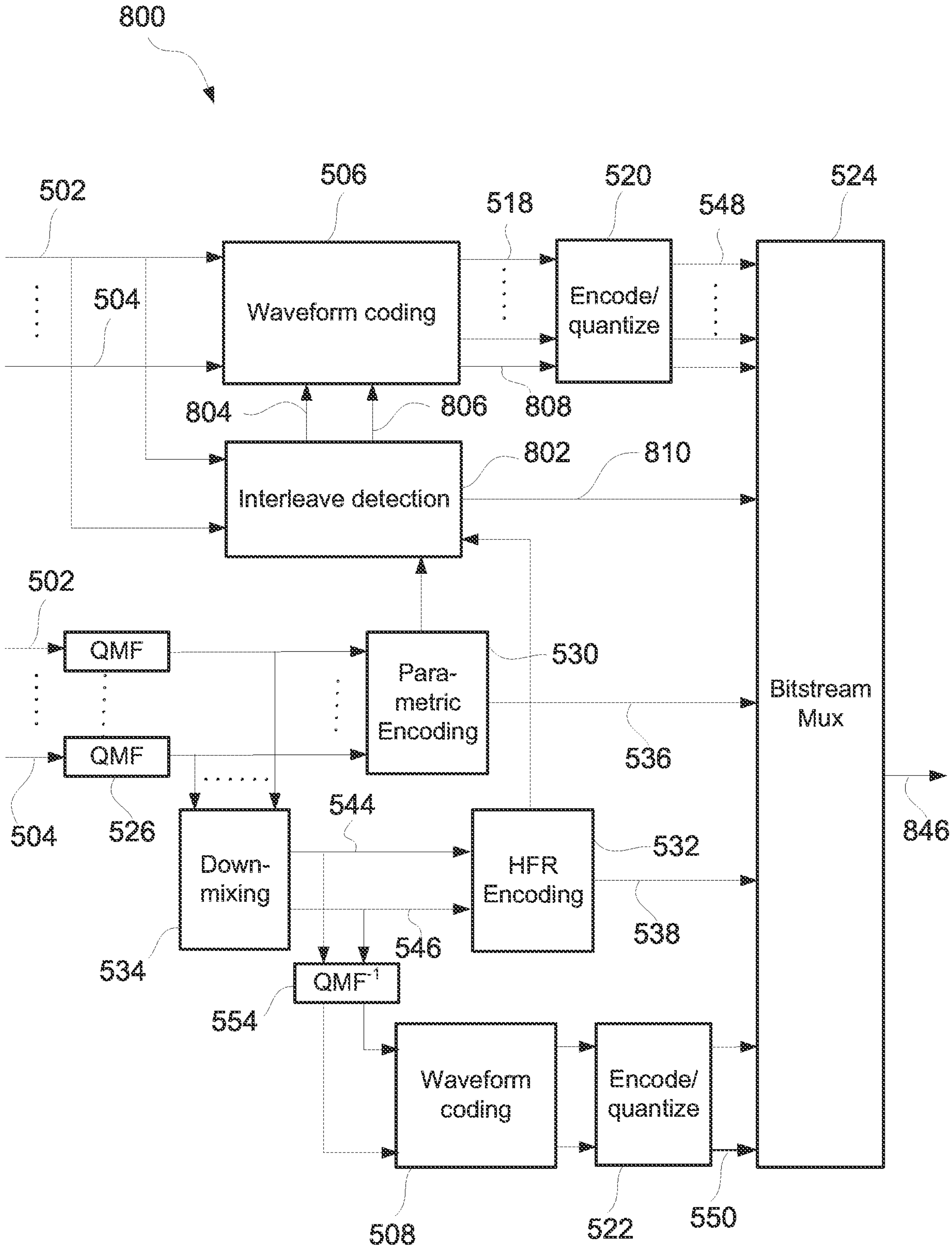
FIG. 8 is a generalized block diagram of an encoding system in accordance with an example embodiment.

FIG. 8 illustrates an alternative embodiment of an encoding system 800. The difference between the encoding system 800 of FIG. 8 and the encoding system 500 of FIG. 5 is that the encoder 800 is arranged to generate a further waveform-coded signal by waveform-coding one or more of the input signals 502, 504 for a frequency range corresponding to a subset of the frequency range above the first cross-over frequency.

For this purpose, the encoder 800 comprises an interleave detecting stage 802. The interleave detecting stage 802 is configured to identify parts of the input signals 502, 504 that are not well reconstructed by the parametric reconstruction as encoded by the parametric encoding stage 530 and the high frequency reconstruction encoding stage 532. For example, the interleave detection stage 802 may compare the input signals 502, 504, to a parametric reconstruction of the input signal 502, 504 as defined by the parametric encoding stage 530 and the high frequency reconstruction encoding stage 532. Based on the comparison, the interleave detecting stage 802 may identify a subset 804 of the frequency range above the first cross-over frequency which is to be waveform-coded. The interleave detecting stage 802 may also identify the time range during which the identified subset 804 of the frequency range above the first cross-over frequency is to be waveform-coded. The identified frequency and time subsets 804, 806 may be input to the first waveform encoding stage 506. Based on the received frequency and time subsets 804 and 806, the first waveform encoding stage 506 generates a further waveform-coded signal 808 by waveform-coding one or more of the input signals 502, 504 for the time and frequency ranges identified by the subsets 804, 806. The further waveform-coded signal 808 may then be encoded and quantized by stage 520 and added to the bit-stream 846.

The interleave detecting stage 802 may further comprise a control signal generating stage. The control signal generating stage is configured to generate a control signal 810 indicating how to interleave the further waveform-coded signal with a parametric reconstruction of one of the input signals 502, 504 in a decoder. For example, the control signal may indicate a frequency range and a time range for which the further waveform-coded signal is to be interleaved with a parametric reconstruction as described with reference to FIG. 7. The control signal may be added to the bitstream 846.

Equivalents, Extensions, Alternatives and Miscellaneous

Further embodiments of the present disclosure will become apparent to a person skilled in the art after studying the description above. Even though the present description and drawings disclose embodiments and examples, the disclosure is not restricted to these specific examples. Numerous modifications and variations can be made without departing from the scope of the present disclosure, which is defined by the accompanying claims. Any reference signs appearing in the claims are not to be understood as limiting their scope.

Additionally, variations to the disclosed embodiments can be understood and effected by the skilled person in practicing the disclosure, from a study of the drawings, the disclosure, and the appended claims. In the claims, the word “comprising” does not exclude other elements or steps, and the indefinite article “a” or “an” does not exclude a plurality. The mere fact that certain measures are recited in mutually different dependent claims does not indicate that a combination of these measured cannot be used to advantage.

The systems and methods disclosed hereinabove may be implemented as software, firmware, hardware or a combination thereof. In a hardware implementation, the division of tasks between functional units referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media typically embodies computer readable instructions, data structures, program modules or other data in a modulated data signal such as a carrier wave or other transport mechanism and includes any information delivery media.

The invention claimed is:

1. A decoding method in a multi-channel audio processing system, the decoding method comprising:
  - de multiplexing from a bitstream a parameter for frequency reconstruction;
  - receiving at least a waveform-coded downmix signal comprising spectral coefficients corresponding to frequencies above a first fixed cross-over frequency;
  - performing frequency reconstruction to determine a reconstructed signal based on the waveform-coded downmix signal based on the parameter, wherein the reconstructed signal is above a second cross-over frequency, wherein the second fixed cross-over frequency is different than the first cross-over frequency; and
  - performing a parametric upmix of the reconstructed signal into M upmix signals.

2. The method of claim 1, wherein the M upmix signals are interleaved with M waveform coded signals.

3. The method of claim 1, wherein M>1.

4. The method of claim 1, wherein the waveform-coded downmix signal is determined based on downmixing M waveform coded signals.

5. A non-transitory computer-readable medium having stored thereon instructions, that when executed by one or more processors, cause one or more processors to perform the method of claim 1.

6. An apparatus for decoding in a multi-channel audio processing system, the apparatus comprising:
  - a de-multiplexor for de multiplexing from a bitstream a parameter for frequency reconstruction;
  - a receiver configured to receive at least a waveform-coded downmix signal comprising spectral coefficients corresponding to frequencies above a first fixed cross-over frequency;
  - a frequency reconstructor for performing frequency reconstruction to determine a reconstructed signal based on the waveform-coded downmix signal based on the parameter, wherein the reconstructed signal is above a second fixed cross-over frequency, wherein the second fixed cross-over frequency is different than the first fixed cross-over frequency, and wherein the frequency reconstruction is based on the waveform-coded downmix signal; and
  - an upmixer for performing a parametric upmix of the reconstructed signal into M upmix signals.

7. The apparatus of claim 6, wherein M>1.

8. The apparatus of claim 6, wherein the waveform-coded downmix signal is determined based on downmixing M waveform coded signals, wherein M>1.

* * * * *